UNITED STATES PATENT OFFICE.

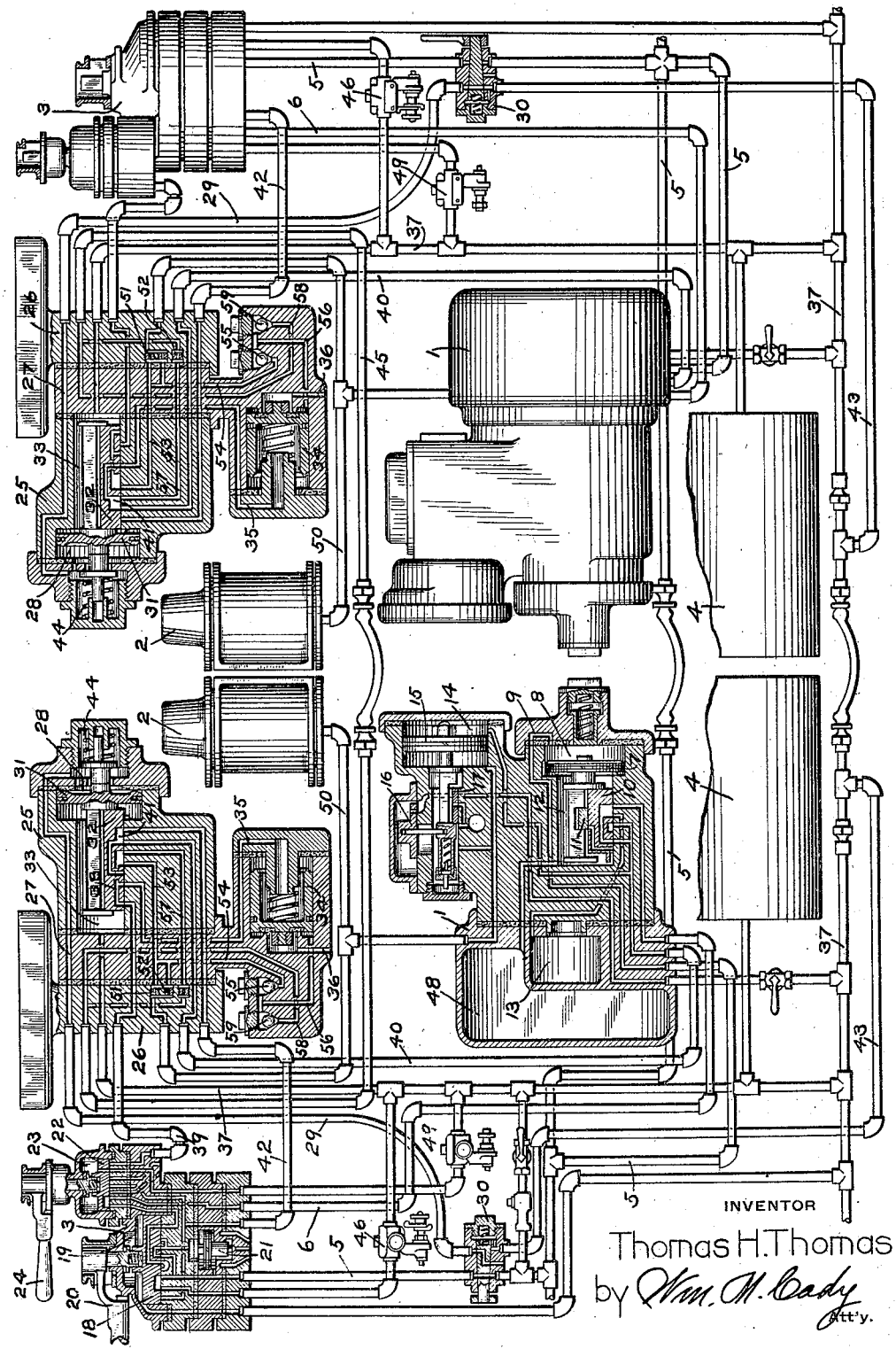

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

LOCOMOTIVE BRAKE EQUIPMENT.

1,390,592.  Specification of Letters Patent.  Patented Sept. 13, 1921.

Application filed May 10, 1919. Serial No. 296,179.

*To all whom it may concern:*

Be it known that I, THOMAS H. THOMAS, a citizen of the United States, residing at Edgewood, in the county of Allegheny and State of Pennsylvania, have invented new and useful Improvements in Locomotive Brake Equipments, of which the following is a specification.

This invention relates to a locomotive brake equipment, similar in character to that shown and described in Patent No. 1,316,208 of Walter V. Turner, dated September 16, 1919.

While in ordinary cases the above equipment provides for the release of the brakes as quickly and promptly as may be desired, in some cases of very heavy locomotives employing large brake cylinder volumes and in double or triple heading, the release of the brakes may not be rapid enough.

The principal object of my invention is to provide means in a locomotive brake equipment such as the above, for securing a quicker and prompter release of the brakes.

In the accompanying drawing, the single figure is a diagrammatic view, partly in section, of a locomotive brake equipment embodying my invention.

As shown in the drawing, the locomotive brake equipment is of the double end type having at each end of the locomotive, a distributing valve device 1 for controlling the admission and release of fluid under pressure to and from the brake cylinder 2, a combined automatic and independent brake valve device 3, a main reservoir 4, an automatic brake pipe 5, and an independent brake pipe 6.

The distributing valve device 1 may comprise the usual equalizing valve portion having a piston 7 contained in piston chamber 8, connected by passage 9 to brake pipe 5, and a main slide valve 10 and graduating slide valve 11, contained in valve chamber 12 and adapted to be operated by piston 7.

The equalizing valve device controls the admission and release of fluid under pressure to and from an application chamber 13 of the application and release portion of the distributing valve device, which comprises a piston chamber 14, adapted to be connected to the application chamber and containing piston 15, an application slide valve 16, and a release slide valve 17, adapted to be operated by piston 15.

The automatic brake valve may comprise a rotary valve 18 contained in valve chamber 19 and adapted to be operated by handle 20 and the usual equalizing discharge valve mechanism 21. The independent brake valve may comprise a rotary valve 22 contained in valve chamber 23 and adapted to be operated by handle 24.

According to my invention, a transfer valve device 25 is provided at each end of the locomotive and interposed between a pipe bracket 26 and said transfer valve device 25 is a filling piece 27 including the quick release valve device.

The transfer valve device 25 may comprise a casing having a piston chamber 28, connected to a pipe 29, controlled by cut-out cock 30 and containing piston 31, and a slide valve 32, contained in valve chamber 33 and adapted to be operated by piston 31.

The quick release valve device may comprise a valve piston 34 having one side connected to a passage 35, leading to the seat of slide valve 32, and adapted to control a direct exhaust from the brake cylinder 2 to an atmospheric exhaust port 36.

In operation, the cut-out cock 30 at the operating end of the locomotive is turned to its open position, as shown at the left hand side of the drawing, in which pipe 29 is connected to the atmosphere.

Since main reservoir pressure is supplied to the valve chamber 33 through pipe 37, the piston 31 and slide valve 32 will be shifted to their outer positions. In this position, passage 35 is connected through cavity 38 in slide valve 32 with a pipe 39 leading to the seat of the independent rotary valve 22 and also connects pipe 40, leading to application piston chamber 14 of the distributing valve device, through cavity 41 in slide valve 32 with pipe 42, leading to the seat of the independent rotary valve 22.

At the non-operating end of the locomotive, as shown at the right hand end of the drawing, the cut-out cock 30 is turned to its closed position, in which a pipe 43, leading to main reservoir pipe 37 is connected to the pipe 29, so that fluid at main reservoir pressure is supplied to piston chamber 28 of the transfer valve device at the non-operating end of the locomotive.

The fluid pressures being thus balanced upon opposite sides of the piston 31, said piston and the slide valve 32 will be shifted to their inner positions by spring 44.

In this position, pipe 40 is connected through cavity 41 in slide valve 32 with an equalizing pipe 45, while passage 35 is connected, through an extension of said cavity, with the same pipes.

With the automatic brake valve in running position, as shown at the left of the drawing, fluid is supplied in the usual manner from the main reservoir through the feed valve device 46 and cavity 47 in the rotary valve 18 to the automatic brake pipe 5, charging the brake pipe, and the piston chamber 8 of the equalizing valve device of each distributing valve device. From the piston chamber 8 fluid flows through the usual feed groove around piston 7, charging valve chamber 12 and pressure chamber 48.

In order to effect an independent application of the brakes on the locomotive, the independent brake valve handle is turned to application position, in which fluid is supplied from the main reservoir through a reducing valve device 49 to pipe 42 and thence through cavity 41 in transfer slide valve 32 to pipe 40.

The application piston chamber 14 of the distributing valve device at the operating end of the locomotive is thus supplied with fluid under pressure and the piston 15 then operates the application slide valve 16 to open communication for supplying fluid to the brake cylinder in the usual manner.

Fluid supplied to the brake cylinder 2 also flows from brake cylinder pipe 50, through chokes 51 and 52 to passage 53 and thence flows to the equalizing pipe 45, through cavity 38 in slide valve 32. As the equalizing pipe 45 is connected through cavity 41 in slide valve 32 with pipe 40 at the non-operating end of the locomotive, fluid will also be supplied to the application piston chamber of the distributing valve device at the non-operating end, so that the application piston will operate the slide valve 16 at that end to supply fluid to the brake cylinder.

As so far described, the operation is similar to that of the construction shown in application of Walter V. Turner, hereinbefore referred to.

According to the present invention, however, means are provided for securing a prompt and quick release of the brakes.

In order to release the brakes independently, the independent brake valve handle 24 is turned to release position, in which pipe 39 is connected to an atmospheric exhaust port. Fluid is then vented from the spring side of the release valve piston 34, through passage 35 and cavity 38 in the transfer slide valve 32.

The brake cylinder pipe 50 is connected through the chokes 51 and 52 with passage 54 and consequently fluid at brake cylinder pressure flows from passage 54 past check valve 55 to passage 56 which leads to the outer seated area of valve piston 34.

The valve piston 34 is therefore lifted from its seat by brake cylinder pressure and opens a direct exhaust from the brake cylinder to the atmosphere through exhaust port 36.

Fluid is also vented from the equalizing pipe 45 through passage 58 past check valve 59, to passage 56 and thence to the atmospheric port 36, so that at the non-operating end of the locomotive the quick release valve 34 is operated by the venting of fluid through passage 35, cavity 41 in slide valve 32, and passage 57 to the equalizing pipe 45. The opening of the quick release valve 34 at the non-operating end of the locomotive then operates to quickly release fluid from the brake cylinder, as at the operating end.

In the release position of the independent brake valve, the pipe 42 is connected to the atmosphere, so that fluid in the application chamber 14 of the distributing valve device at the operating end of the car is vented through pipe 40, cavity 41 in the transfer slide valve 32 to pipe 42 and the application piston 15 then operates the release valve 17 to release fluid from the brake cylinder, in addition to the release effected by the operation of the quick release valve 34.

The pressure in the equalizing pipe 45 being reduced in releasing the brakes, as hereinbefore described, fluid will be vented from the application chamber of the distributing valve at the non-operating end of the locomotive through pipe 40, cavity 41 in transfer valve 32, passage 57 to the equalizing pipe 45, so that the release of the brakes at the non-operating end is also assisted by the operation of the release valve of the distributing valve device.

The check valve 59 prevents back flow from the seating side of the release valve 34 to the equalizing pipe 45 at the non-operating end, which would otherwise prevent the operation of the release valve at this end.

The check valve 55 prevents back flow from the seating side of the release valve 34 to the independent brake valve at the operating end, so that fluid will not be vented from this side of the release valve, when the independent brake valve is placed in release position for operating the release valve.

The choke 51 is provided so as to permit the rate of flow in applying the brakes to be adjusted to suit the brake cylinder volumes to be handled in a given installation, where the release filling piece 27 is not used and the pipe bracket 26 is applied directly to the transfer valve device 25, so that only the passage 53 is employed.

The additional choke 52 is provided, so as to give an increased flow, where the quick release feature is employed, and the size of this choke may also be varied to suit the requirements of a given installation.

Having now described my invention, what I claim as new, and desire to secure by Letters Patent, is:—

1. In a locomotive brake, the combination with a brake cylinder and a brake equipment at each end of the locomotive for releasing fluid from the brake cylinder, of an additional quick release valve at each end of the locomotive for controlling the exhaust of fluid from the corresponding brake cylinder and means operated from one end of the locomotive upon releasing the brakes for effecting the operation of both release valves.

2. In a locomotive brake, the combination with a brake cylinder and a brake equipment at each end of the locomotive for releasing fluid from the brake cylinder, of an additional release valve at each end of the locomotive adapted to be operated by venting fluid pressure from one side for releasing fluid from the brake cylinder, an equalizing pipe adapted to be vented by the release valve, a valve device having one position for establishing communication for varying the fluid pressure on said release valve and another position for connecting the equalizing pipe with the release valve for venting fluid therefrom, and a brake valve for venting fluid from said release valve.

3. In a locomotive brake, the combination with a brake cylinder and a brake equipment at each end of the locomotive for releasing fluid from the brake cylinder, of an additional release valve at each end of the locomotive operated by venting fluid from one side for connecting the corresponding brake cylinder with an exhaust port, an equalizing pipe adapted to be connected to said exhaust port upon operation of the release valve, a brake valve for venting fluid from the release valve, and a valve device at each end of the locomotive having one position for connecting the corresponding release valve with the brake valve, and another position for connecting the equalizing pipe with the other release valve for venting fluid therefrom.

4. In a locomotive brake, the combination with a brake cylinder and a brake equipment at each end of the locomotive for releasing fluid from the brake cylinder, of a release valve at one end of the locomotive operated by venting fluid from one side for releasing fluid from the brake cylinder, a brake valve, a transfer valve through which the brake valve vents fluid from said release valve, an equalizing pipe adapted to be vented upon the opening of said release valve, a release valve at the other end of the locomotive, and a corresponding transfer valve through which fluid is vented from the release valve to said equalizing pipe.

5. In a locomotive brake, the combination with a brake cylinder and a brake equipment at each end of the locomotive for releasing fluid from the brake cylinder, of a release valve at one end of the locomotive for releasing fluid from the brake cylinder, a brake valve for venting fluid from said release valve to operate same, a release valve at the other end of the locomotive, an equalizing pipe for connecting said release valve to the brake cylinder vent port controlled by the first release valve, and a check valve for preventing back flow from the release valve to the equalizing pipe.

In testimony whereof I have hereunto set my hand.

THOMAS H. THOMAS.